United States Patent
Rodrigues et al.

(10) Patent No.: US 7,133,964 B2
(45) Date of Patent: Nov. 7, 2006

(54) RAID ASSIMILATION METHOD AND APPARATUS

(75) Inventors: Steven Rodrigues, Mountain View, CA (US); David Hitz, Los Altos, CA (US)

(73) Assignee: Network Appliance, Inc, Sunnyvale, CA (US)

( * ) Notice: Subject to any disclaimer, the term of this patent is extended or adjusted under 35 U.S.C. 154(b) by 915 days.

(21) Appl. No.: 10/105,872

(22) Filed: Mar. 20, 2002

(65) Prior Publication Data

US 2003/0182494 A1 Sep. 25, 2003

(51) Int. Cl.
*G06F 12/00* (2006.01)

(52) U.S. Cl. .............................. 711/114; 711/4; 711/170

(58) Field of Classification Search ................ 711/114, 711/117, 156, 162, 201, 4, 170; 714/6; 707/201; 710/36
See application file for complete search history.

(56) References Cited

U.S. PATENT DOCUMENTS

| | | | | |
|---|---|---|---|---|
| 4,974,156 A | * | 11/1990 | Harding et al. | 711/162 |
| 5,615,352 A | * | 3/1997 | Jacobson et al. | 711/114 |
| 5,950,230 A | * | 9/1999 | Islam et al. | 711/156 |
| 6,363,457 B1 | * | 3/2002 | Sundberg | 711/114 |
| 6,453,369 B1 | * | 9/2002 | Imamura et al. | 710/36 |
| 6,549,978 B1 | * | 4/2003 | Mansur et al. | 711/114 |
| 6,636,984 B1 | * | 10/2003 | McBrearty et al. | 714/6 |
| 6,694,335 B1 | * | 2/2004 | Hopmann et al. | 707/201 |
| 6,725,331 B1 | * | 4/2004 | Kedem | 711/117 |

* cited by examiner

*Primary Examiner*—Matthew Kim
*Assistant Examiner*—Paul Schlie
(74) *Attorney, Agent, or Firm*—Arnold M. de Guzman

(57) ABSTRACT

A method of determining a configuration of a collection of storage units, includes: generating a configuration, identifying for a specific configuration by use of a configuration identifier; and assigning the specific configuration to the first labels of all storage units and then to the second labels of all storage units, and utilizing the configuration identifier to determine the most recent configuration successfully written to all disks in the configuration.

80 Claims, 15 Drawing Sheets

RAID ASSIMILATION METHOD AND APPARATUS

TECHNICAL FIELD

The present invention relates generally to computer systems, and more particularly to file systems and storage devices.

BACKGROUND

Storage devices are employed to store data that are accessed by computer systems. Examples of storage devices include volatile and non-volatile memory, floppy drives, hard disk drives, tape drives, optical drives, or another type of storage units. A storage device may be locally attached to an input/output (I/O) channel of a computer. For example, a hard disk drive may be connected to a computer's disk controller. A storage device may also be accessible over a network. Examples of such a storage device include network attached storage (NAS) and storage area network (SAN) devices. A storage device may be a single stand-alone component or may include a system of storage devices such as in the case of Redundant Array Of Inexpensive Disks (RAID) groups and some Direct Access Storage Devices (DASD).

However, current technologies are limited to particular capabilities and suffer from various constraints. For example, multi-disk file systems are becoming more complex and are in need of a robust solution for organizing the disks. Additionally, current multi-disk file systems are constrained in operation when errors occur during the configuration of the disks.

SUMMARY

In accordance with an embodiment of the invention, a method of assigning configuration information to a logical storage unit, including: writing the configuration information to a first and a second label on the disks in the logical storage unit, determining the disks in the logical storage unit when presented with a large collection of disks, some of which may not be in the logical storage unit, In an embodiment, a method also determines if the most recent configuration information was successfully written to all disks in the logical storage unit; if so, that configuration is used for the logical storage unit, and if not, the next most recent configuration is used for the logical storage unit.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
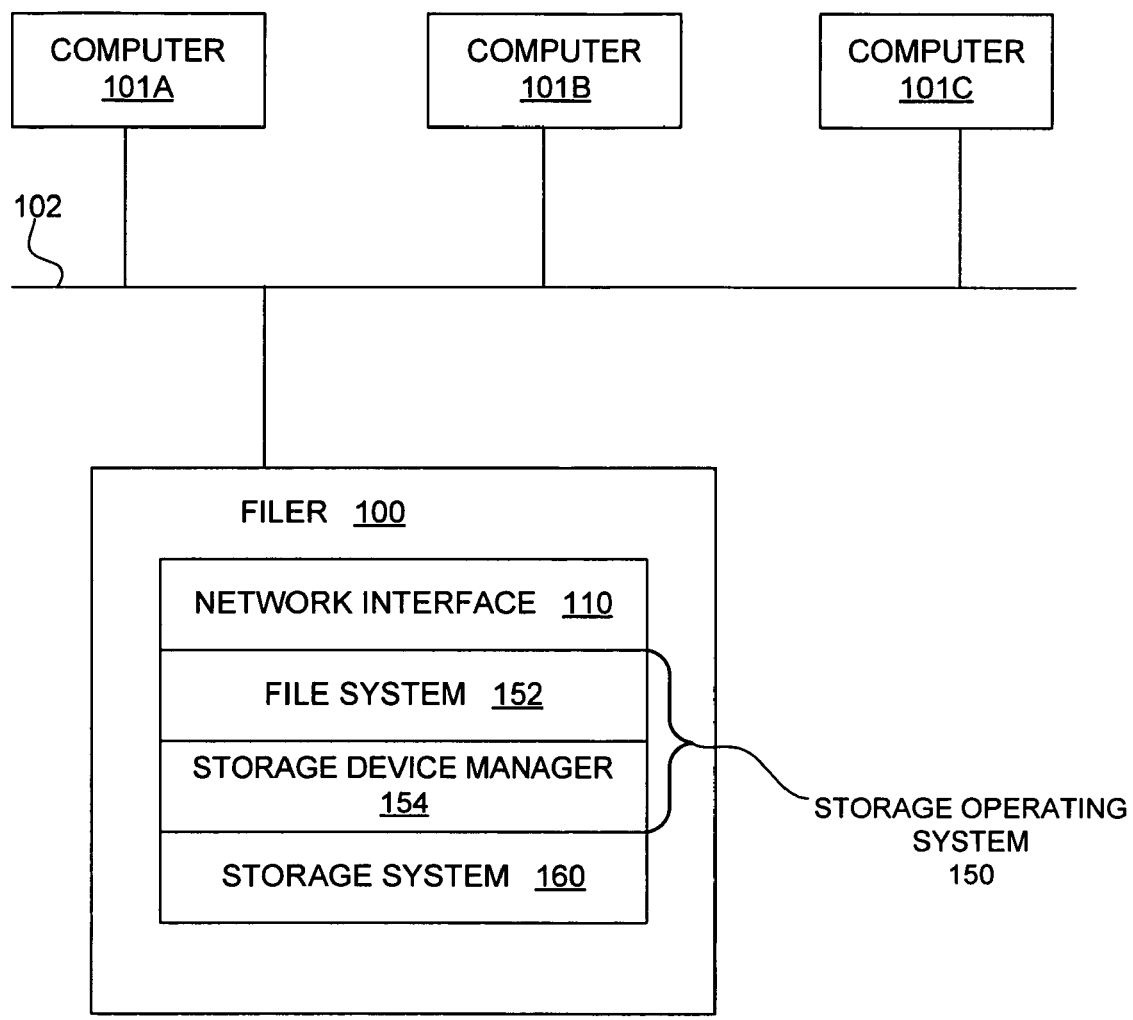
FIG. 1 shows a schematic diagram of a computing environment in accordance with an embodiment of the present invention.

FIG. 1 illustrates a schematic diagram of a computing environment in accordance with an embodiment of the present invention. In the example of FIG. 1, one or more computers 101 (e.g., computers 101A, 101B, and 101C) are coupled to a file server or filer 100 over a network 102. A computer 101 may be any type of data processing device capable of sending write and read requests to the filer 100. For example, a computer 101 may be, without limitation, a personal computer, mini-computer, mainframe computer, portable computer, workstation, wireless terminal, personal digital assistant, cellular phone, or another type of processing device. The filer 100 may also be any suitable computing device.

The network 102 may, for example, include various types of communication networks such as wide area networks, local area networks, the Internet, or another type of network. Other nodes on the network 102 such as, for example, gateways, routers, bridges, firewalls, and/or the like, are not depicted in FIG. 1 for clarity of illustration.

The filer 100 provides data storage services over the network 102. In one embodiment, the filer 100 processes data read and write requests from a computer 101. Of course, the filer 100 does not necessarily have to be accessible over network 102. Depending on the application, a filer 100 may, for example, also be locally attached to an input/output (I/O) channel of a computer 101.

As shown in FIG. 1, in an embodiment, the filer 100 may include a network interface 110, a storage operating system 150, and a storage system 160. The storage operating system 150 may further include a file system 152 and a storage device manager 154. The storage system 160 may include one or more storage devices. Components of the filer 100 may be implemented in hardware, software, and/or firmware. For example, the filer 100 may be a computer having one or more processors running computer-readable program code of the storage operating system 150 in memory. Software components of the filer 100 may be distributed on computer-readable storage media (e.g., CD-ROMS, tapes, disks, ZIP drive, and/or another type of storage media) or transmitted over wired or wireless link to a computer 101.

The network interface 110 includes components for receiving storage-related service requests over network 102. The network interface 110 forwards a received service request to storage operating system 150, which processes the request by reading data from the storage system 160 in the case of a read request, or by writing data to the storage system 160 in the case of a write request. Data read from the storage system 160 are transmitted over the network 102 to the requesting computer 101. Similarly, data to be written to the storage system 160 are received over network 102 from a computer 101.

Figure 2:
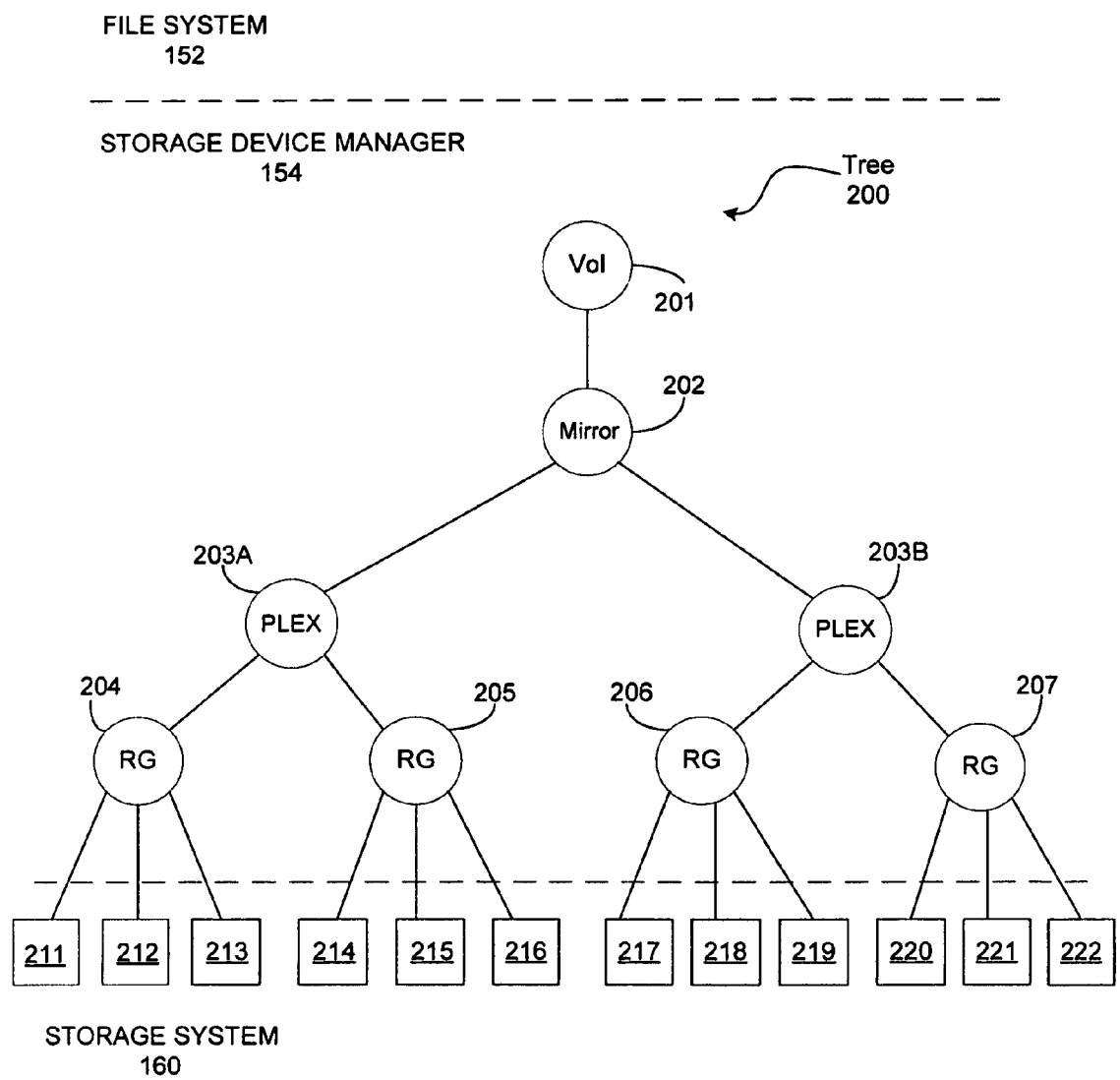
FIG. 2 shows a logical diagram illustrating the relationship between a file system, a storage device manager, and a storage system in accordance with an embodiment of the present invention.

FIG. 2 shows a logical diagram further illustrating the relationship between a file system 152, a storage device manager 154, and a storage system 160, in accordance with an embodiment of the present invention. In one embodiment, a file system 152 and a storage device manager 154 are implemented in software while a storage system 160 is implemented in hardware. As can be appreciated, however, the file system 152, storage device manager 154, and storage system 160 may be implemented in hardware, software, and/or firmware. For example, data structures, tables, and maps may be employed to define the logical interconnection between the file system 152 and storage device manager 154. As another example, the storage device manager 154 and storage system 160 may communicate via a disk controller. In one embodiment, the storage device manager 154 is configured to permit at least one of the methods described below. For example, the storage device manager 154 is configured to determine a configuration information for disks in the storage system 160 and to update the configuration information of the disks, and may perform other methods as described below.

The file system 152 manages files that are stored in storage system 160. In one embodiment, the file system 152 organizes files in accordance with the Write-Anywhere-File Layout (WAFL) as disclosed in the following commonly-assigned disclosures, which are fully incorporated herein by reference: U.S. Pat. No. 6,289,356, U.S. Pat. No. 5,963,962, and U.S. Pat. No. 5,819,292. However, the present invention is not so limited and may also be used with other file systems and layouts. For example, an embodiment of the invention may be used with SANs or block-based systems.

It is noted that an embodiment of the invention permits two or more discrete storage units to be organized into logical collections. The storage units may be, for example, disk drives, compact flash, or non-volatile random access memory (NVRAM) cards. The logical collections are also not limited to RAID groups or plexes, as described in the examples herein. The logical collections may be any suitable logical units.

The storage device manager 154 manages the storage devices in the storage system 160. The storage device manager 154 receives read and write commands from the file system 152 and processes the commands by accordingly accessing the storage system 160. The storage device manager 154 takes a block's logical address from the file system 152 and translates that logical address to a physical address in one or more storage devices in the storage system 160. In one embodiment, the storage device manager 154 manages storage devices in accordance with Redundant Arrays of Inexpensive Disks (RAID) level 4, and accordingly stripes data blocks across storage devices and uses separate parity storage devices. It should be understood, however, that an embodiment of the present invention may also be used with data storage architectures other than RAID level 4. For example, an embodiment of the present invention may be used with other RAID levels, Direct Access Storage Devices (DASDs), and non-arrayed storage devices.

As shown in FIG. 2, in one embodiment, the storage device manager 154 is logically organized as a tree 200 of objects that include a volume 201, a mirror 202, plexes 203 (i.e., 203A and 203B), and RAID groups 204–207. It is noted that embodiments of the invention, including the methods discussed below, may be generally applicable to mirrored volumes with multiple plexes, and are not limited to just two-plex mirrors. It is also to be noted that implementing a mirror in a logical layer below the file system 152 advantageously allows for a relatively transparent fail-over mechanism. For example, because the file system 152 does not necessarily have to know of the existence of the mirror, a failing plex 203 does not have to be reported to file system 152. When a plex fails, the file system 152 may still read and write data as before. This minimizes disruption to file system 152 and also simplifies its design.

The use of mirrors in conjunction with file systems is also discussed in the following commonly-assigned U.S. patent applications, which are fully incorporated herein by reference: U.S. application Ser. No. 09/825,855, filed on Apr. 3, 2001 and U.S. application Ser. No. 09/684,487, filed on Oct. 4, 2000.

Still referring to FIG. 2, the volume 201 represents a file system. The mirror 202 is one level below volume 201 and manages the pair of mirrored plexes 203. The plex 203A is a duplicate of the plex 203B, and vice versa. Each plex 203 represents a full copy of the file system of volume 201.

Below each plex 203 is one or more RAID groups that have associated storage devices in storage system 160. In the example of FIG. 2, the storage devices (storage units) 211–213 belong to the RAID group 204, the storage devices 214–216 belong to the RAID group 205, the storage devices 217–219 belong to the RAID group 206, and the storage devices 220–222 belong to the RAID group 207. The RAID group 204 mirrors the RAID group 206, while RAID group 205 mirrors the RAID group 207. As can be appreciated, the storage devices 211–222 are not necessarily housed in the same cabinet or facility. For example, the storage devices 211–516 may be located in a data center in one city, while the storage devices 217–222 may be in another data center in another city. This advantageously allows data to remain available even if a facility housing one set of storage devices is hit by a disaster (e.g., fire, earthquake, or another event).

In one embodiment, the storage devices 211–222 include hard disk drives communicating with the storage device manager 154 over a Fiber Channel Arbitrated Loop link and configured in accordance with RAID level 4. Implementing a mirror with RAID level 4 significantly improves data availability. Ordinarily, RAID level 4 does not have provisions for mirroring. Thus, although a storage system according to RAID level 4 may survive a single disk failure, it may not be able to survive double disk failures. Implementing a mirror with RAID level 4 improves data availability by providing back up copies in the event of a double disk failure in one of the RAID groups.

Because the plex 203A and plex 203B mirror each other, data may be accessed through either the plex 203A or plex 203B. This allows data to be accessed from a surviving plex in the event one of the plexes goes down and becomes inaccessible. This is particularly advantageous in mission-critical applications where a high degree of data availability is required. To further improve data availability, the plex 203A and plex 203B may also utilize separate pieces of hardware to communicate with storage system 160.

As further shown in FIG. 2, a tree object 200 may contain information about the objects of volume 201, mirror 202, plexes 203, RAID groups 204–207, and the disks 211–222.

Figure 3:
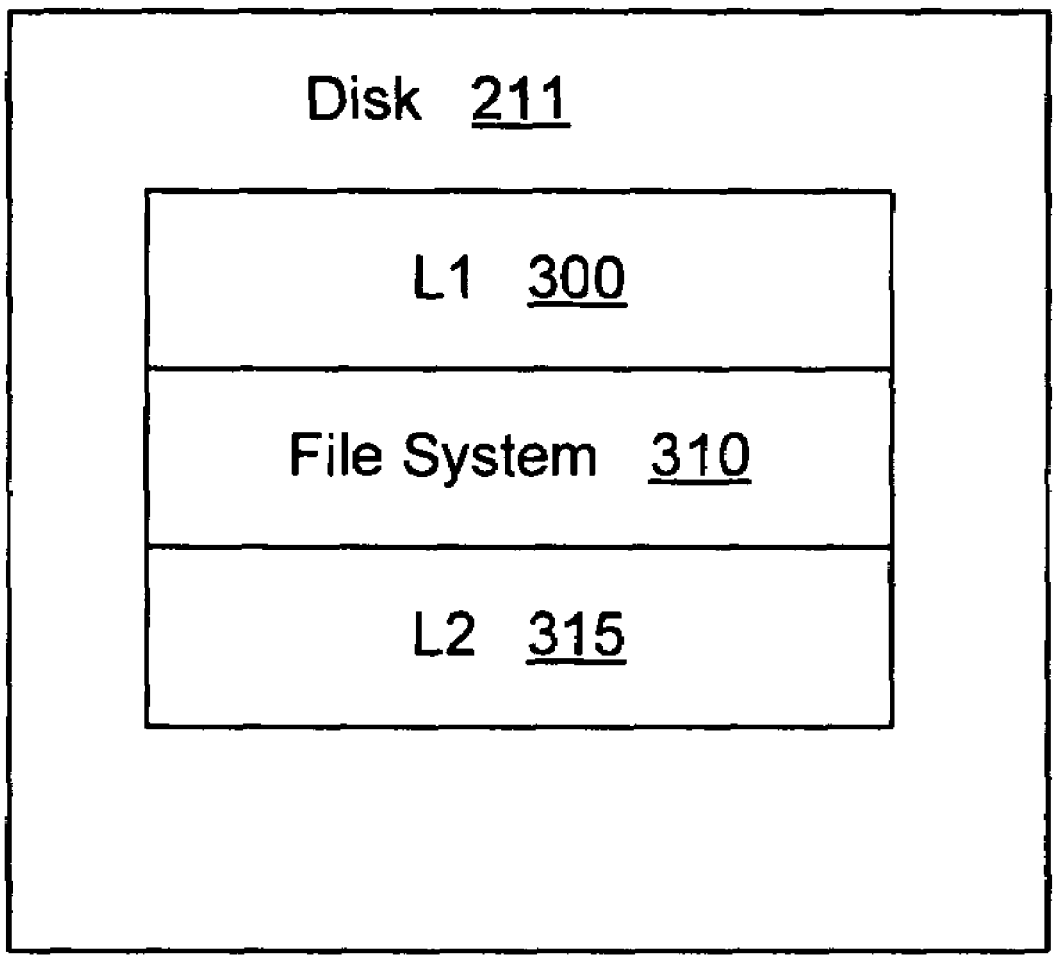
FIG. 3 is a block diagram that shows information that can be stored in a disk.

FIG. 3 is a block diagram that shows information that can be stored in a disk. For example, the disk 211 includes a disk block 300 that stores configuration data L1 and a disk block 315 that stores configuration data L2 which is a duplicate of L1. The configuration data in L1 and L2 are discussed further below for determining the configuration to assign to a disk, in accordance with an embodiment of the invention. A disk block 310 stores data and software such as, for example, the filesystem 152.

Figure 4:
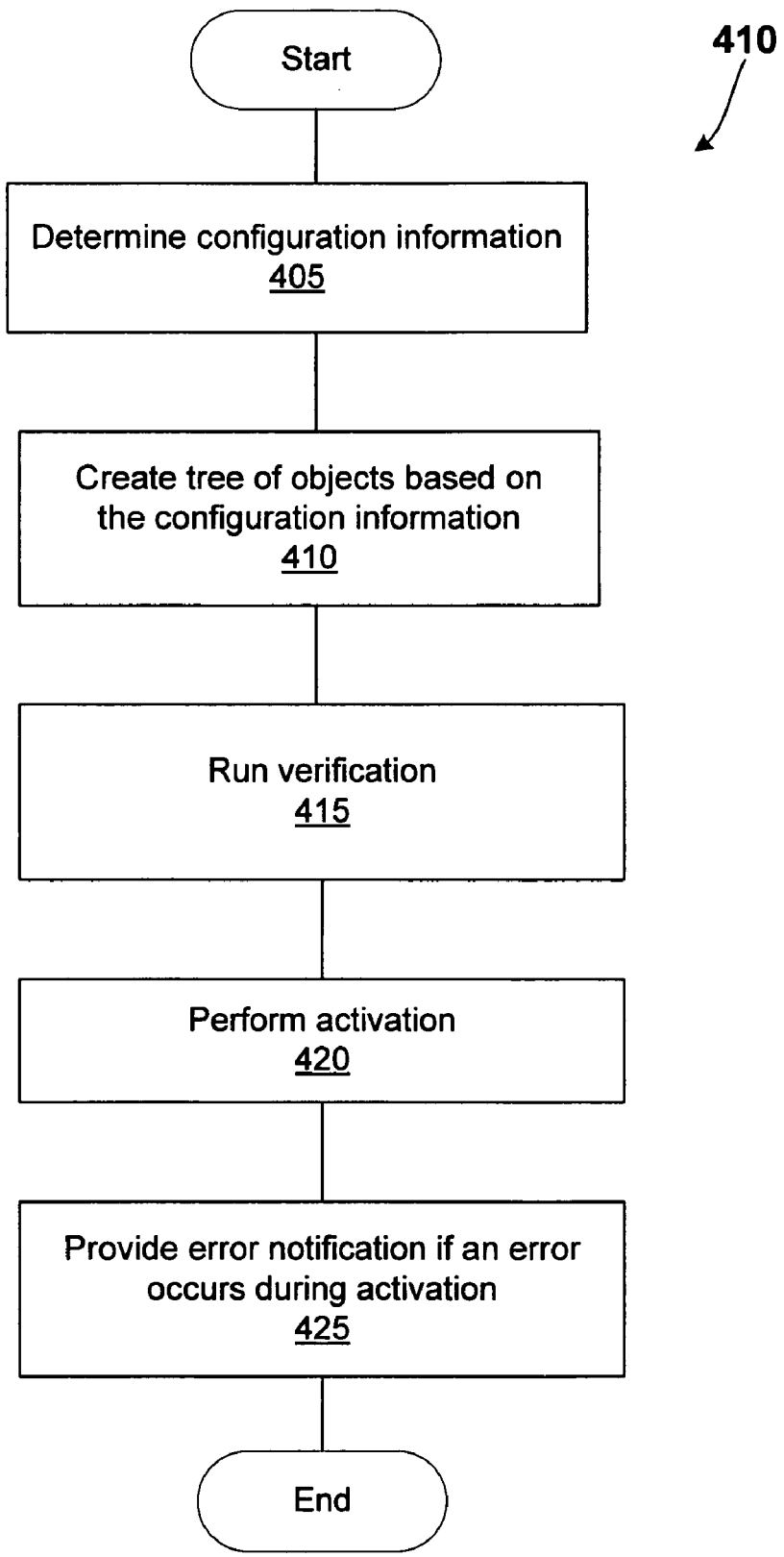
FIG. 4 is flowchart of a method of using configuration information from disks to create a volume.

FIG. 4 is a method of using configuration information from a set of disks to assemble a volume. Configuration information for each volume is first determined (405). The action (405) is discussed in additional detail below. After the configuration information is determined for each volume, a tree of objects is created (410) based on the determined configuration information. The action (410) is discussed in additional detail below. A verification is then run (415) to verify that the created tree of objects is usable for the storage system 160. For example, a check is made to make sure that the tree of objects is not missing multiple disks, that there are no conflicting objects, that there is no erroneous configuration information, and/or the like. After running the verification, an activation is performed (420) where the disks and other objects are activated for use by the storage system 160. If, for example, an error occurs in a disk or other object during the activation action (420), then an error notification may be provided (425) by the storage device manager 154. It is also noted that when adding disks to, for example, a RAID group, events may be set to the RAID group by use of Fibre Channel discovery techniques to indicate that a disk has been added to the RAID group.

Figure 5:
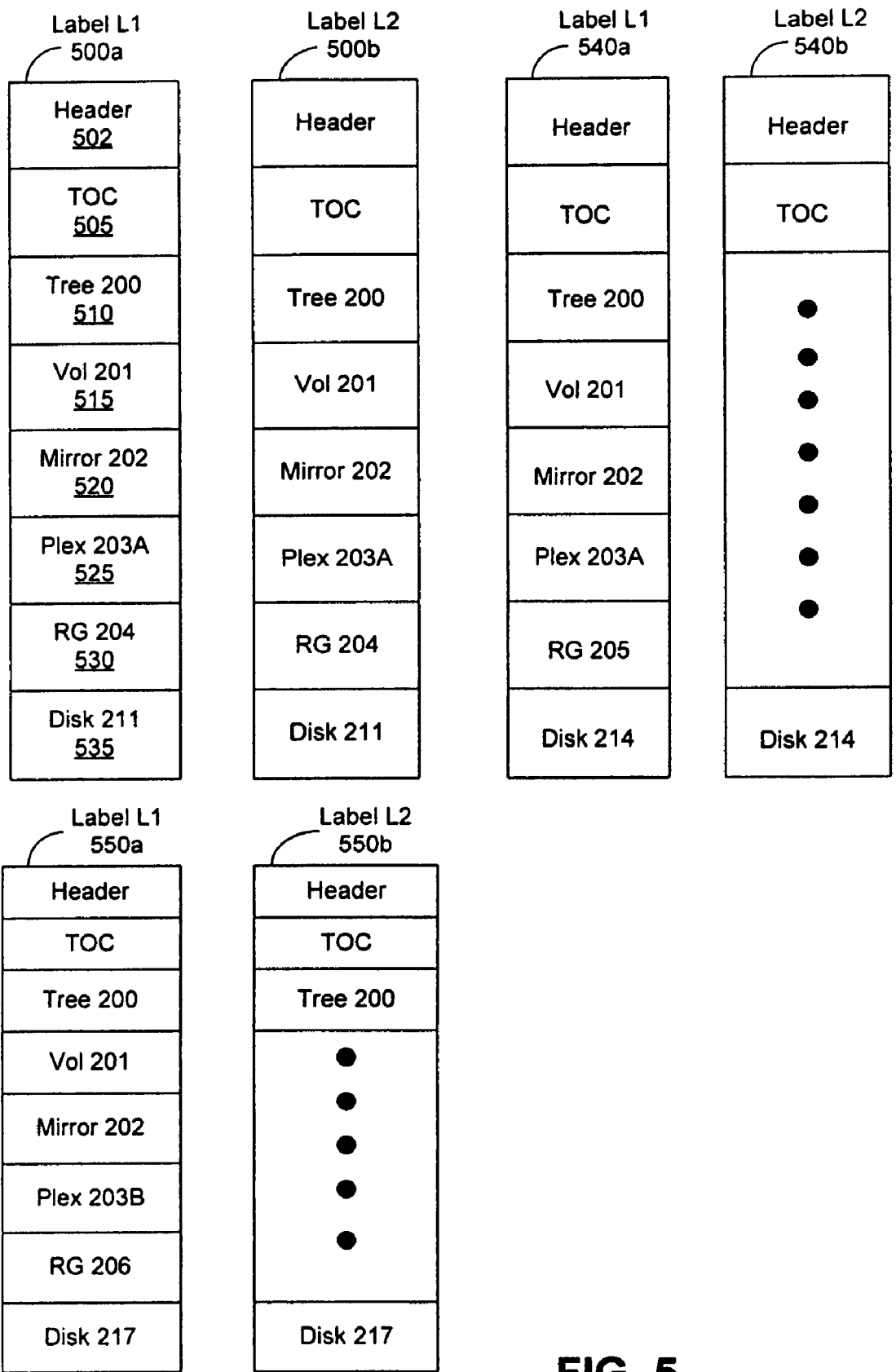
FIG. 5 illustrates block diagrams of the details for disk labels, in accordance with an embodiment of the invention.

FIG. 5 illustrates block diagrams of the details for labels (e.g., RAID labels), in accordance with an embodiment of the invention. A label is a portion of a volume configuration database that is stored in a given disk and contains configuration information about that given disk and the logical storage unit(s) it belongs to. In the described embodiment of the invention, configurations are maintained and updated on a per-plex basis; other logical collections have their configurations in sync with that of plexes.

The configuration information for a given disk is the information needed to identify and place a disk within a larger collection of disks, and general information about that larger collection. In this particular case, the configuration information identifies the RAID group (a logical collection), the disks' position within the RAID group, the plex (a logical collection), and the volume (a logical collection) that the disk belongs to, and general information about each of those collections (size of the RAID groups, number of plexes, size in blocks of the volume, and/or other information). Thus, the configuration includes "collection identifiers" that references which collection(s) a storage unit potentially belongs to. As shown in FIG. 5, a collection identifier may be a volume ID, plex ID, or RAID group ID.

When a label for a disk is updated, the configuration of the volume is generated, and split into labels for each of the disks in the volume. These labels are then written onto the disks in the volume. The first label L1 is first updated and written onto the disk, followed by the second label L2 which is updated and written onto the disk. The first label L1 is written onto all disks in the volume before the second label L2 is written onto any disks in the volume. If there are any errors writing the label L1 on any of the disks in the volume, the second label L2 is not written. If a volume has multiple plexes, and a given plex is offline (due to operator instruction, a disk failure, or other condition), its disks are not written to and this is not considered an error for the purposes of the label update.

As an example, the labels 500a/500b are each stored in the disk 211 and each contains configuration information about disk 211. The label 500a includes the following configuration information about disk 211: a header 502 containing identifying information about the disk, a table of contents (TOC) 505 that includes information 510 indicating that disk 211 is in tree 200, information 515 indicating that disk 211 is in volume 201 (a logical collection), information 520 indicating that disk 211 is in mirror 202 (a logical collection), information 525 indicating that disk 211 is in plex 203A (a logical collection), and information 530 indicating that disk 211 is in RAID group 204 (a logical collection). Label L2 500b contains duplicate configuration information as shown for Label L1 500a. The TOC 505 also typically indicates which of the information above is active to indicate whether the disk is an active disk in the volume or a spare disk.

Thus, a label for a particular disk contains information about a "slice" of the RAID tree object 200, where the slice is the path between the disk and the tree object 200. It is further noted that for the objects shown in FIG. 2, each object contains information about itself as well information about objects immediately below it. As an example, the plex object 203A contains information about itself and information about RAID group objects 204 and 205. Similarly, the mirror object 202 contains information about itself and information about plexes 203A and 203B.

Similarly, labels 540a and 540b for disk 214 includes the following configuration information about disk 214: a header containing identifying information about the disk, a table of contents (TOC) including information indicating that disk 214 is in tree 200, information indicating that disk 214 is in volume 201, information indicating that disk 214 is in mirror 202, information indicating that disk 214 is in plex 203A, and information indicating that disk 214 is in RAID group 205.

Similarly, labels 550a and 550b for disk 217 includes the following configuration information about disk 217: a header containing identifying information about the disk, a table of contents (TOC) that includes information indicating that disk 217 is in tree 200, information indicating that disk 217 is in volume 201, information indicating that disk 217 is in mirror 202, information indicating that disk 217 is in plex 203B, information indicating that disk 217 is in RAID group 206.

Other disks in a RAID group (e.g., all disks shown in FIG. 2) also include a pair of RAID labels, with each label containing associated configuration information for the disk as described above.

Figure 6:
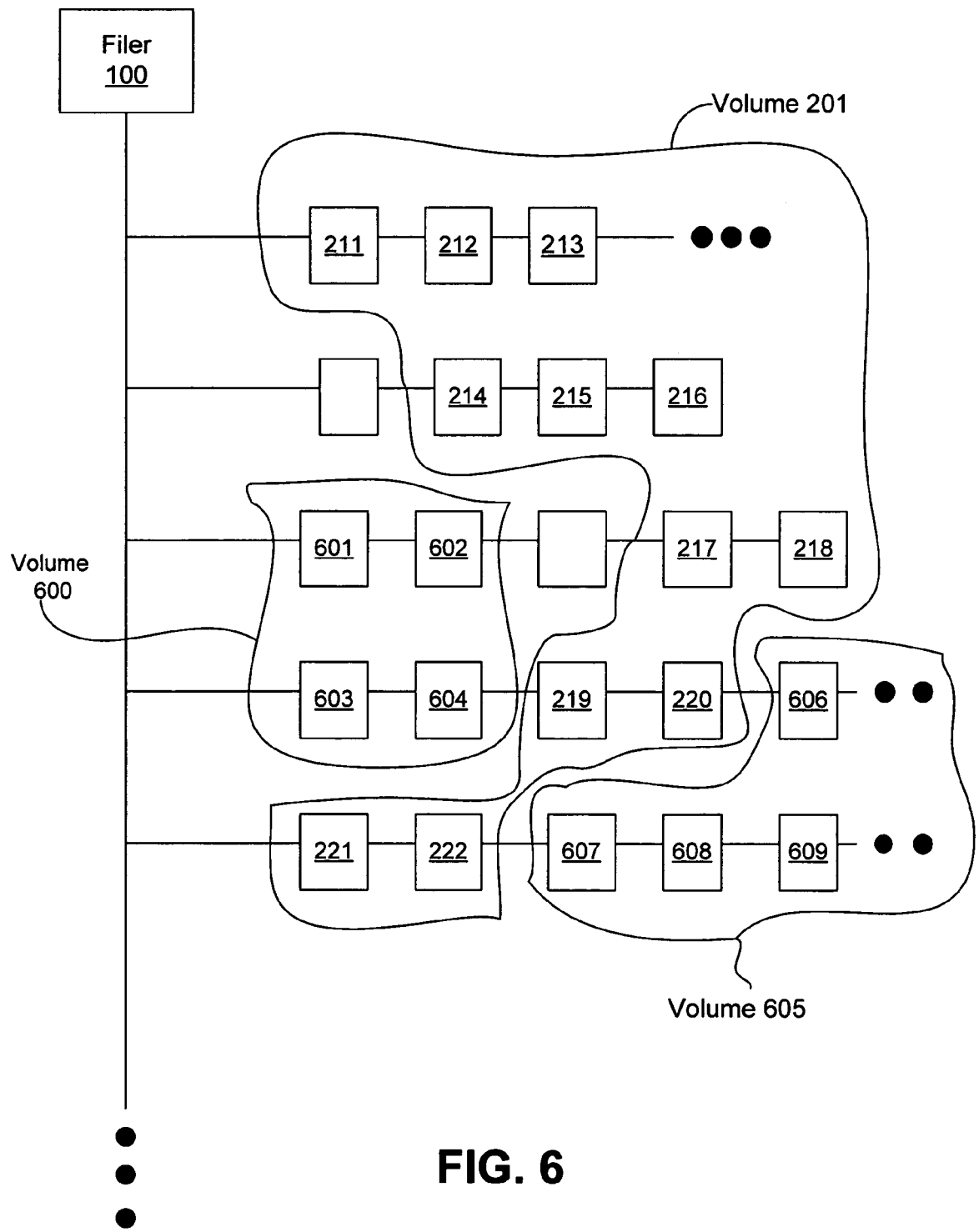
FIG. 6 is a block diagram illustrating an example of a physical relationship between volumes and disks.

As shown in FIG. 6, the configuration information in a label L1 or L2 permits a disk to be identified and associated together with other disks in a given volume, plex, or other logical collection. For example, the configuration information in the disks 211–22 permits those disks to be associated with volume 201. Similarly, the configuration information in labels for disks 601–604 permits those disks to be associated with volume 600. Configuration information in labels for disks 606–609 permits those disks to be associated with volume 605. It is noted that each row of disks may, for example, represent a shelf containing those disks. Thus, the disks 211–213 may be in the same shelf, while the disks 214–216 may be in another shelf.

Figure 7:
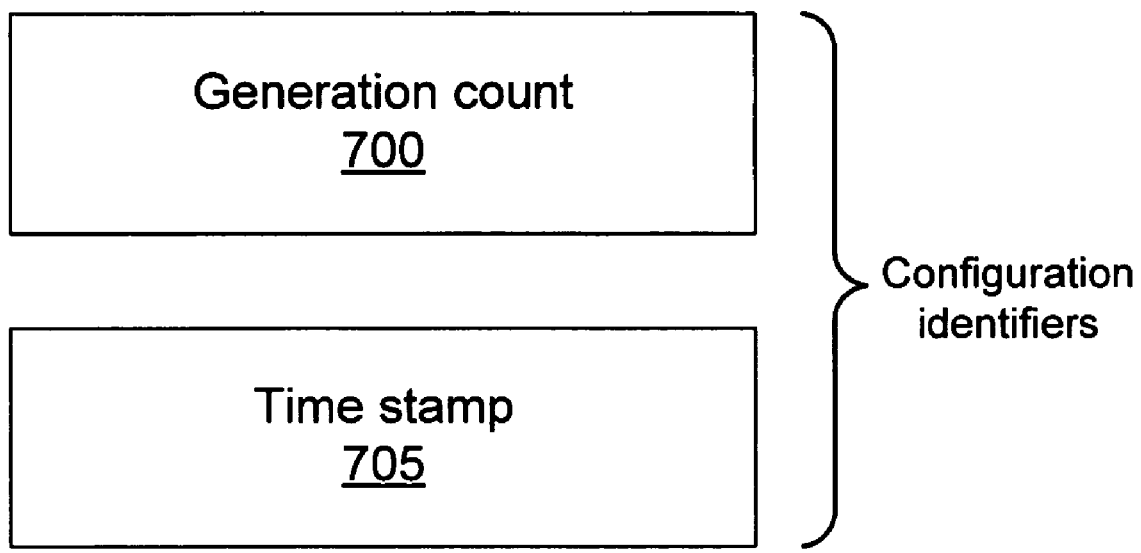
FIG. 7 is a block diagram illustrating the time-stamp and generation count identifiers for a configuration data.

As shown in FIG. 7, configuration data in a label may be identified by a generation count 700 and/or a time stamp 705. The generation count 700 is value that increments by one (1) each time that the configuration is updated. The time stamp 705 is a monotonically increasing time value that indicates the time of the last update for the configuration data.

Figure 8:
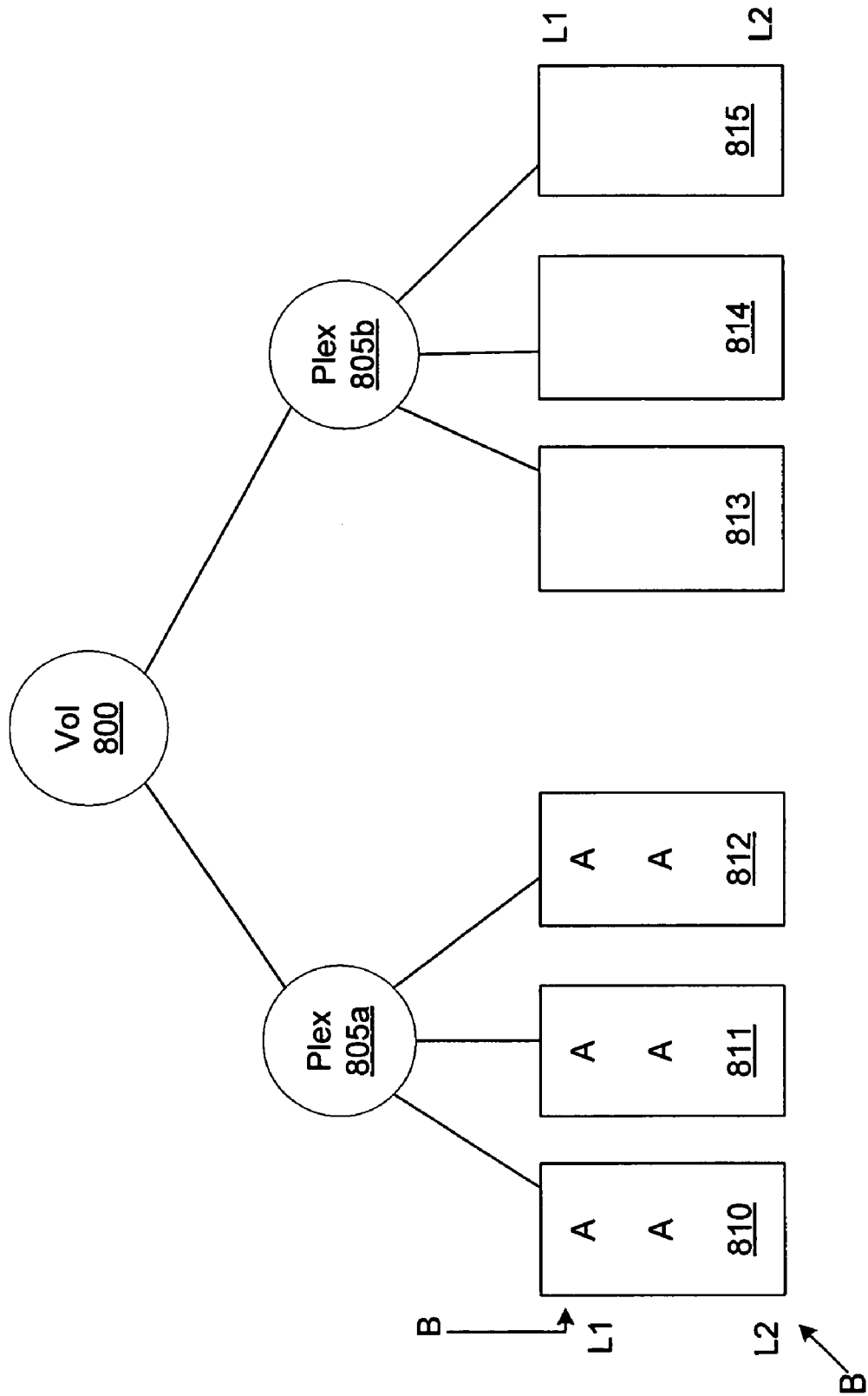
FIG. 8 is a block diagram showing particular disks in plexes in a volume.

FIG. 8 is a block diagram showing particular disks 810–812 in plex 805a of volume 800, and disks 813–815 in plex 805b of volume 800. For purposes of clarity, a first label and second label in a disk will be denoted as label L1 and label L2, respectively. As described below, two copies of configuration data (in labels L1 and L2) are present on every disk within a volume. Each configuration data has a distinct logical time-stamp and associated generation-count. Each configuration data has identifiers used to indicate which logical storage units (volume, plex, RAID group) that a disk belongs to. The time-stamp and/or the generation-count may be used to identify the version of the configuration data that was most recently written to all valid disks in a volume or plex. The time-stamps and/or generation count are compared for every disk within a volume or plex and the results of this comparison are used to decide which copy of the configuration data will be used to configure the disk and the logical storage units that contain the disk. The described embodiment uses both the time-stamp and generation count, but another embodiment could use just a time-stamp.

To update configuration information in a disk, the label L1 in a disk is first written. Thus, configuration A (which contains configuration information) is first written to labels L1 of disks 810–812 and then written to labels L2 of disks 810–812. If plex 805B is off-line, the configuration information will not be written on the disks 813–815. To update the configuration information in the disks, an updated configuration information B may be written to labels L1 of disks 810–812 and then written to labels L2 of disks 810–812 if the disks are on-line with the volume 800. The configuration information B is only written to labels L2 of disks 810–812 if it was successfully written to the label L1 of all the disks 810–812.

Figure 9A:
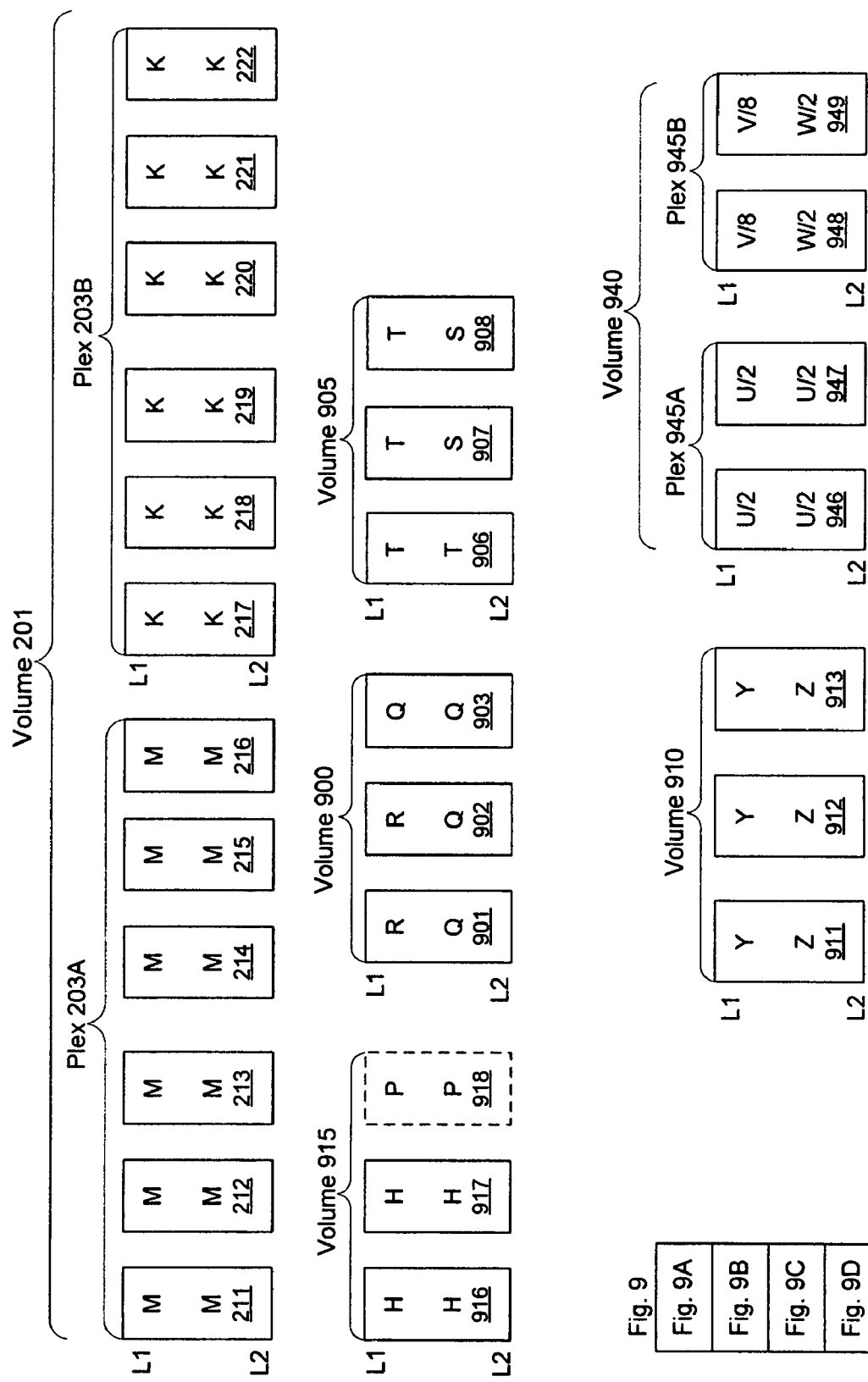
FIG. 9A is a block diagram illustrating disks associated with particular volumes and/or plexes for purposes of describing a method of determining configuration information in a disk, in accordance with an embodiment of the invention.

FIG. 9A is a block diagram illustrating disks associated with particular volumes and/or plexes for purposes of describing a method of determining configuration information for a logical storage unit such as a volume or plex, in accordance with an embodiment of the invention. It is noted that the number of volumes shown in FIG. 9A is provided only as an example to describe the various cases that may arise during a configuration update and during configuration determination, and that any number of volumes and any number of disks in a volume may be used with this method. It is also noted that the configuration updates and determination shown in FIG. 9A are typically carried out by manipulation of data structures in memory.

As an example, assume that for plex 203A of volume 201, the configuration M was written to the labels L1 and L2 of the disks 211–216. First, the set of labels for the disks 211–216 is scanned and the most recent configuration is determined through use of the generation count 700 in each label L1 and L2. This configuration is M. To determine that configuration M is the valid configuration data for the plex 203A, a determination is made if one of the disks has the same configuration data in its label L1 and label L2. In the example for plex 203A, configuration M is in labels L1 and L2 in at least one of the disks (e.g., disk 211 Therefore, configuration M is noted as the most recent valid configuration data for disks in plex 203A of volume 201.

As another example, assume that for plex 203B, the configuration K was written to the labels L1 and L2 of the disks 217–222. Again, the set of L1 and L2 labels for the disks 217–222 is scanned and the most recent configuration is determined through use of the generation count 700 in each label. In this case, it is configuration K. To verify that configuration K is valid configuration data, a determination is made if at least one of the disks has the same configuration data in its label L1 and label L2. In the example for plex 203B, configuration K is in labels L1 and L2 in at least one of the disks (e.g., disk 217). Therefore, configuration K is noted as the valid configuration data for disks in plex 203B of volume 201.

As another example, assume that for volume 900, an updated configuration R was being written to disks 901–903 to replace their current configuration Q. However, when configuration R was being written to the disk 903, the updated configuration R could not be written to the label L1 of the disk 903 due to, for example, a system crash and/or other events. Because of the label update method described above, configuration R is not written to any of the L2 labels. When the L1 and L2 labels are examined, configuration R is determined to be the most recent configuration because of its generation count 700. Because the generation count always increments by 1, configuration Q is noted to the next most recent configuration because of its generation count 700. To determine the valid configuration data for the volume 900, a determination is made if at least one of the disks has the most recent configuration data in its label L1 and label L2. In the example for volume 900, no disk has configuration R in both L1 and L2. Next, a determination is made if at least one disk has the next-most-recent configuration Q. In the example for volume 900, configuration Q is in labels L1 and L2 in at least one of the disks (e.g., disk 903 herefore, configuration Q is noted (used) as the valid configuration data for volume 900.

As another example, assume the volume 915 includes disks 916–918 and disks 916–917 has configuration H, while disk 918 has an old configuration data version (e.g., the configuration P is not a previous generation, based on its generation count 700). This disk 918 would be put in a special state and not used, and, as a result, the configuration P is not chosen as the configuration for disks in volume 915.

As a further example, assume there is volume 977 (see FIG. 9E) with 4 disks, 978–981. Due to a disk failure of disk 981, the configuration of volume 977 changes from G to H. This configuration H is successfully written to L1 of disks 978–980, and then written to the L2 of disk 978 when an event such as a system crash interrupts the configuration update. Disk 981 is not updated because it is no longer part of the volume, and cannot process I/O. Upon assimilation, the L1 and L2 labels of disks 978–981 all claim to belong to volume 977. By examining the generation count 700 of the L1 and L2 labels of disks 978 and 981, the most recent configuration of volume 977 is determined to be H and the next-most-recent configuration of volume 977 is determined to be G. A determination is then made if any disk in volume 977 has the most recent configuration data in both its L1 and L2 labels, indicating that the configuration update made it to all the disks in the volume. Disk 978 has configuration H in both its L1 and L2 labels, indicating that H is valid configuration data for volume 977. Disk 981, with configuration G in both L1 and L2, is considered to be an "obsolete" disk for volume 978 and is removed from the volume.

An external registry of failed disks may be used to indicate obsolete disks such as disk 981 in the above example.

As another example, assume that for volume 905, an updated configuration T was being written to the disks 906–908 to replace current configuration S. The updated configuration T was written to labels L1 of disks 906–908, and label L2 of disk 906, but the updated configuration T could not be written to label L2 of disks 907–908 to replace previous configuration S due to an event such as a disk failure or system crash. During assimilation, the most recent configuration for volume 905 is determined to be T, through evaluation of the generation count 700 of the configuration data of all the disks. A determination is then made if at least one of the disks has the most recent configuration data in its label L1 and label L2. In the example for volume 905, configuration T is in labels L1 and L2 in at least one of the disks (e.g., disk 906 Therefore, configuration T is noted as valid configuration data for volume 905.

As another example, assume that for volume 910, an updated configuration Y was being written to disks 911–913 to replace current configuration Z. The updated configuration Y was written to labels L1 of disks 911–913, but the updated configuration Y could not be written to labels L2 of disks 911–913 to replace previous configuration Z due to an event such as a disk failure or system crash.

This condition in volume 910 may be termed as a "degenerate case".

If it is assumed that disks can either be part of one volume, or be a spare, but not move between volumes, then either configuration can be chosen. Usually, the more recent configuration is used, which is configuration Y in this example.

If, however, it is assumed that a disk could belong to different volumes in its configuration, rather than just being either in one particular volume or being a spare, it is necessary to look at the "membership" specified in the disk labels L1 and L2. A disk may belong to different volumes according to its L1 and L2 labels in a mirroring system that supports "mirror splits" (turning a mirrored volume with two plexes into two volumes with one plex each) and "mirror joins" (turning two volumes with one plex each into one mirrored volume with two plexes). In one embodiment, if a plex is degenerate, re-run assimilation on disks that are associated somehow with that degenerate plex—this may yield a non-degenerate case—but using L2 as the preferred configuration. If re-running the algorithm does not result in a different answer, then the most recent configuration is considered to be the valid configuration for the plex.

Figure 9B:
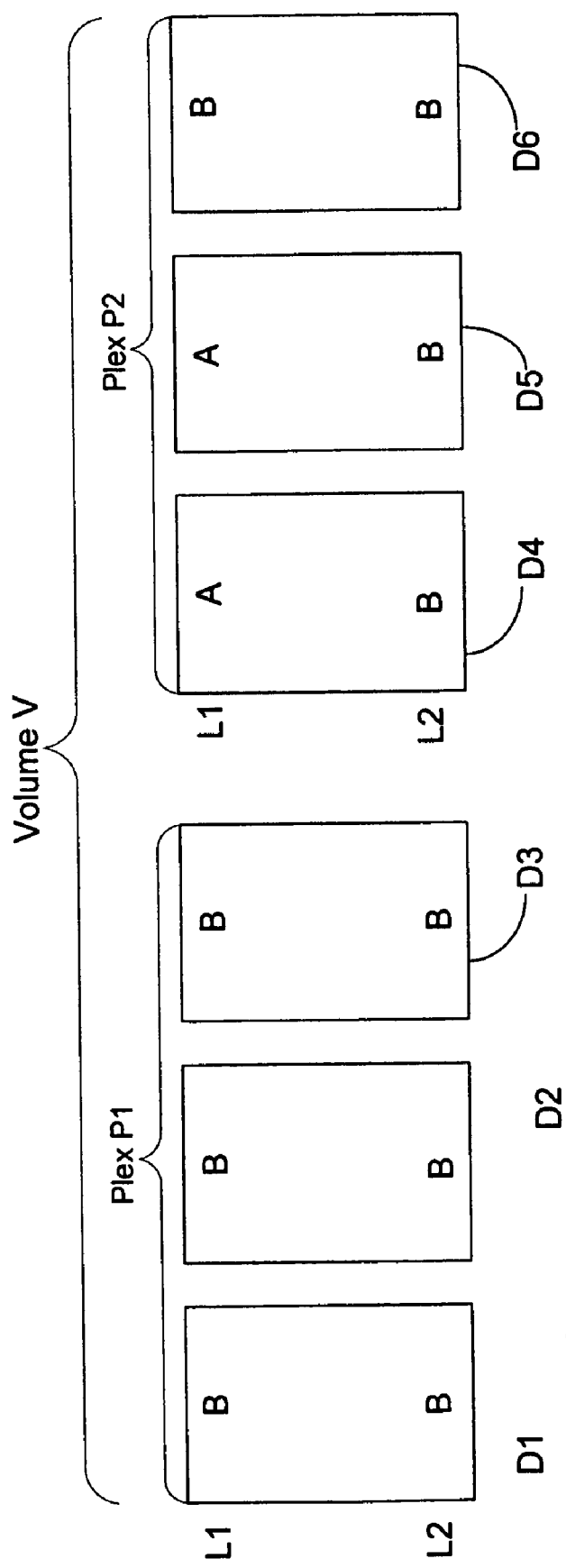
FIG. 9B is a block diagram of an example method for determining a configuration to use in a "degenerate case", in accordance with an embodiment of the invention.

FIG. 9B is a block diagram of an example method for determining a configuration to use in such a "degenerate case". A volume V includes, for example, two plexes P1 and P2, where each plex contains 3 disks (disks D1, D2, D3 in plex P1, and disks D4, D5, D6 in plex P2), at configuration B. We run 'vol split' which runs a configuration change on plex P2 and moves those disks to volume V2 (not shown in FIG. 9B) with configuration A. However, assume a crash occurs after we have written to disks D4 and D5, leaving us with the following as also shown in FIG. 9B:

| D1 | D2 | D3 | D4 | D5 | D6 |
|----|----|----|----|----|----|
| B  | B  | B  | A  | A  | B  |
| B  | B  | B  | B  | B  | B  |

Configuration A describes volume V2 with one plex, PC, and configuration B describes the original mirrored volume V with plexes P1 and P2.

When the described assimilation method runs based on the volume membership in label L1, there are three plexes: plex <V, P1> with disks D1, D2, D3 which assimilates to configuration B; plex <V, P2> with disk D6, which assimilates to configuration B; and plex <V2, P> with disks D4, D5, which is degenerate, and thus cannot decide between configurations A and B.

The simple answer described above would yield that configuration 'A' is a valid configuration, which is wrong in this example. (Volume V is still mirrored and volume V2 is missing disks.) Instead, assimilation must look at the volume/plex IDs in both labels of V2's disks and see <V2, P> and <V, P2>, and then mark both of those plexes as needing to be reassimilated. Disks D4–D6 are then resorted based on the volume/plex IDs in their label L2. This yields the following disks in volume V/plex P2:

| D4 | D5 | D6 |
|----|----|----|
| A  | A  | B  |
| B  | B  | B  |

A is the highest configuration but A is not present in both L1 and L2 of any disk. Configuration B is the next-highest configuration and is present in both L1 and L2 of one disk (D6), so it is the valid configuration for this plex.

As an example of how the timestamp 705 can be used to disambiguate degenerate plexes, consider the volume 940. Assume that the volume 940 includes plex 945A and plex 945B. Assume that plex 945A has disks 946–947 with configurations U at labels L1 and L2, where U has a time stamp of "2". Assume further that plex 945B has disks 948–949 with configuration V at label L1, where V has a time stamp of "8". The disks 948–949 also has configuration W at label L2, where W has an earlier time stamp of "2". By following the method described above, plex 945A would have configuration data U and plex 945B would be degenerate with configuration V preferred. However, because the configuration data U and configuration data V may be divergent, the correct solution is to use configuration data written at the same time. Since configuration W has the same time stamp (time stamp=2) as configuration U in its "sibling" plex 945A, the configuration W will be used for disks 948–949 in plex 945B.

Figure 9C:
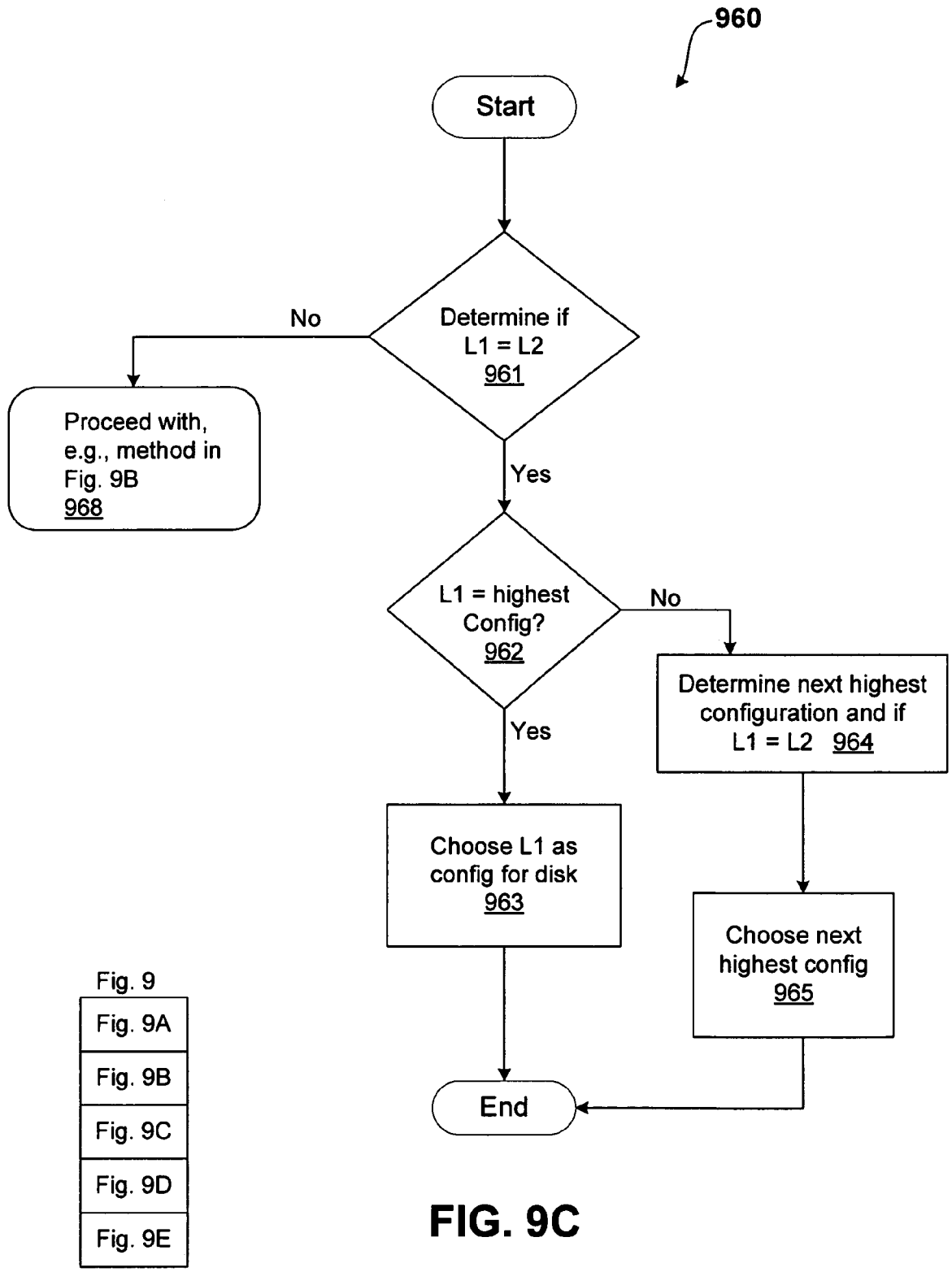
FIG. 9C is a block diagram illustrating a method of determining configuration information for a disk, in accordance with an embodiment of the invention.

FIG. 9C is a flowchart of a method 960 of assigning a configuration to a volume or plex, in accordance with an embodiment of the invention. A determination (961) is made if there is a same configuration in label L1 and label L2 of a disk. If not, then proceed (968) with, for example, a method as described above with reference to FIG. 9B. If L1=L2 in action (961) for some disk in the volume or plex, then a determination (962) is made if the configuration information in label L1 is the highest configuration. If so, then the configuration information in label L1 is valid configuration information for the volume or plex. If, in action (962), the configuration information in label L1 is not the highest configuration information, then the next highest configuration information is determined (964), including determining if the next highest configuration is in labels L1 and L2 of a disk in the plex or volume. If so, then that next highest configuration information is then chosen (965) as the assigned configuration for the plex or volume.

Figure 9D:
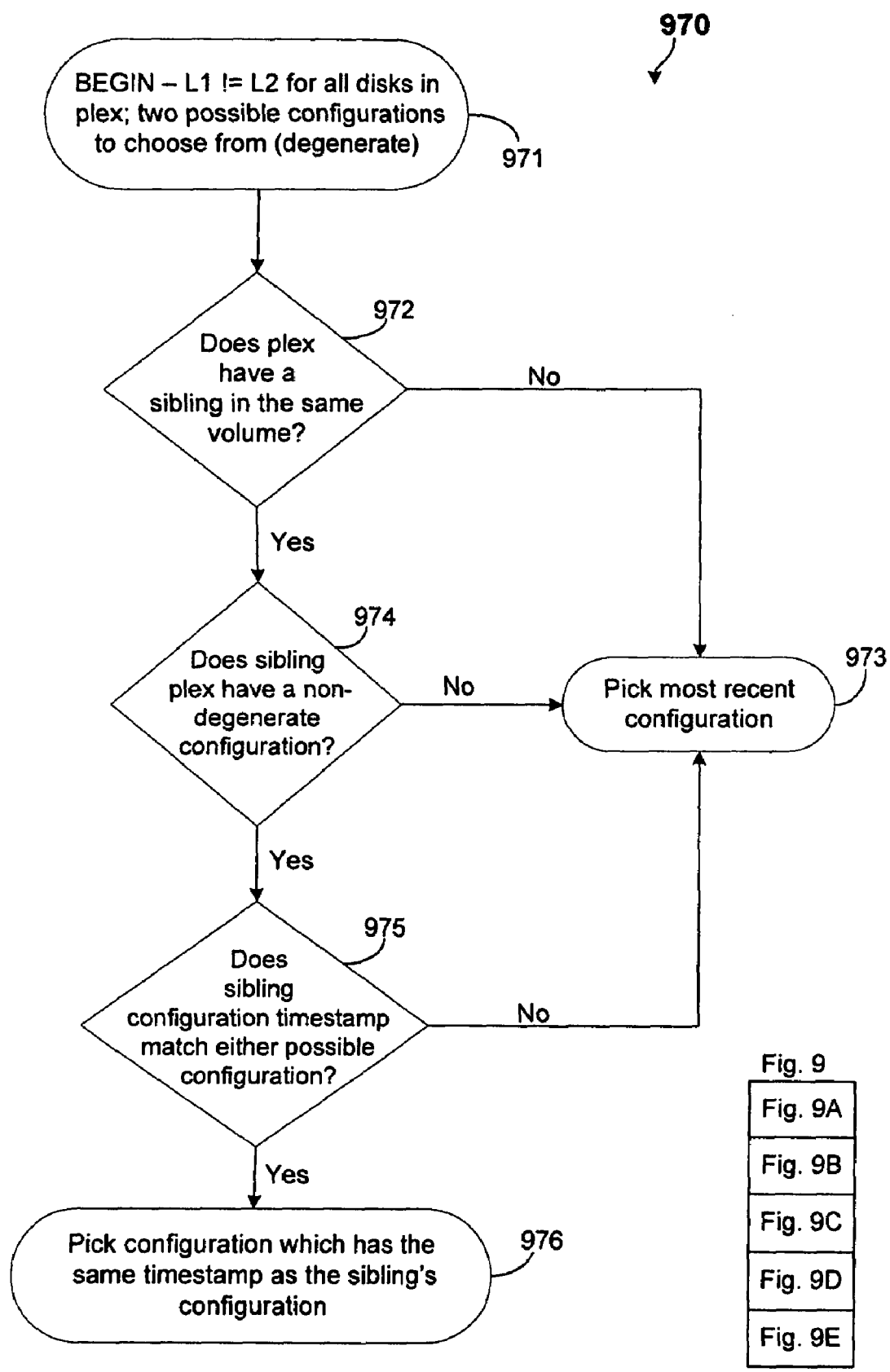
FIG. 9D is a block diagram illustrating another method of determining configuration information for a disk, in accordance with an embodiment of the invention.
Figure 9E:
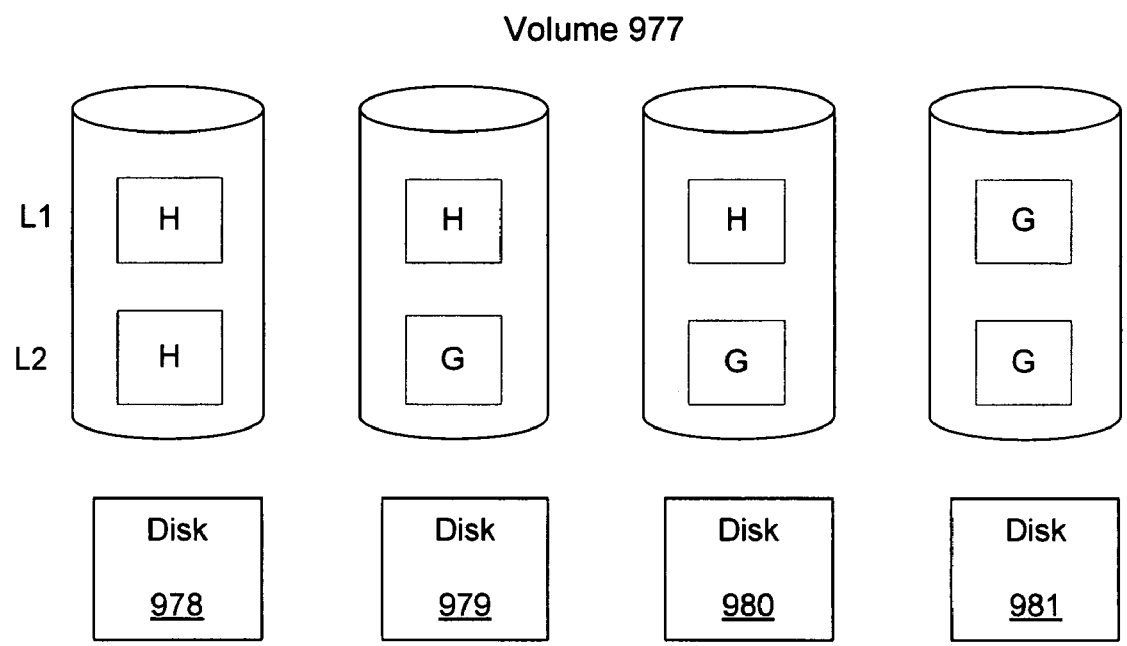
FIG. 9E is a block diagram illustrating another example of a method of determining configuration information for a disk, in accordance with an embodiment of the invention.

FIG. 9D is a flowchart of a method 970 for disambiguating a degenerate plex, in accordance with another embodiment of the invention. Assume that for each disk in the plex, the configuration in the first label L1 is different from the configuration in the second label L2 (L1 L2 ), and thus there are two possible configuration to choose from for the plex (action 971). A determination (972) is made if the plex has a sibling plex in the same volume. If not, then the most recent configuration is picked (973). If so, then a determination (974) is made if the sibling plex has a non-degenerate configuration. If not, then the most recent configuration is picked (973). If so, then a determination (975) is made if the sibling configuration timestamp matches either possible configuration. If not, then the most recent configuration is picked (973). If so, then the configuration which has the same timestamp as the sibling configuration timestamp is picked (976).

Figure 10:
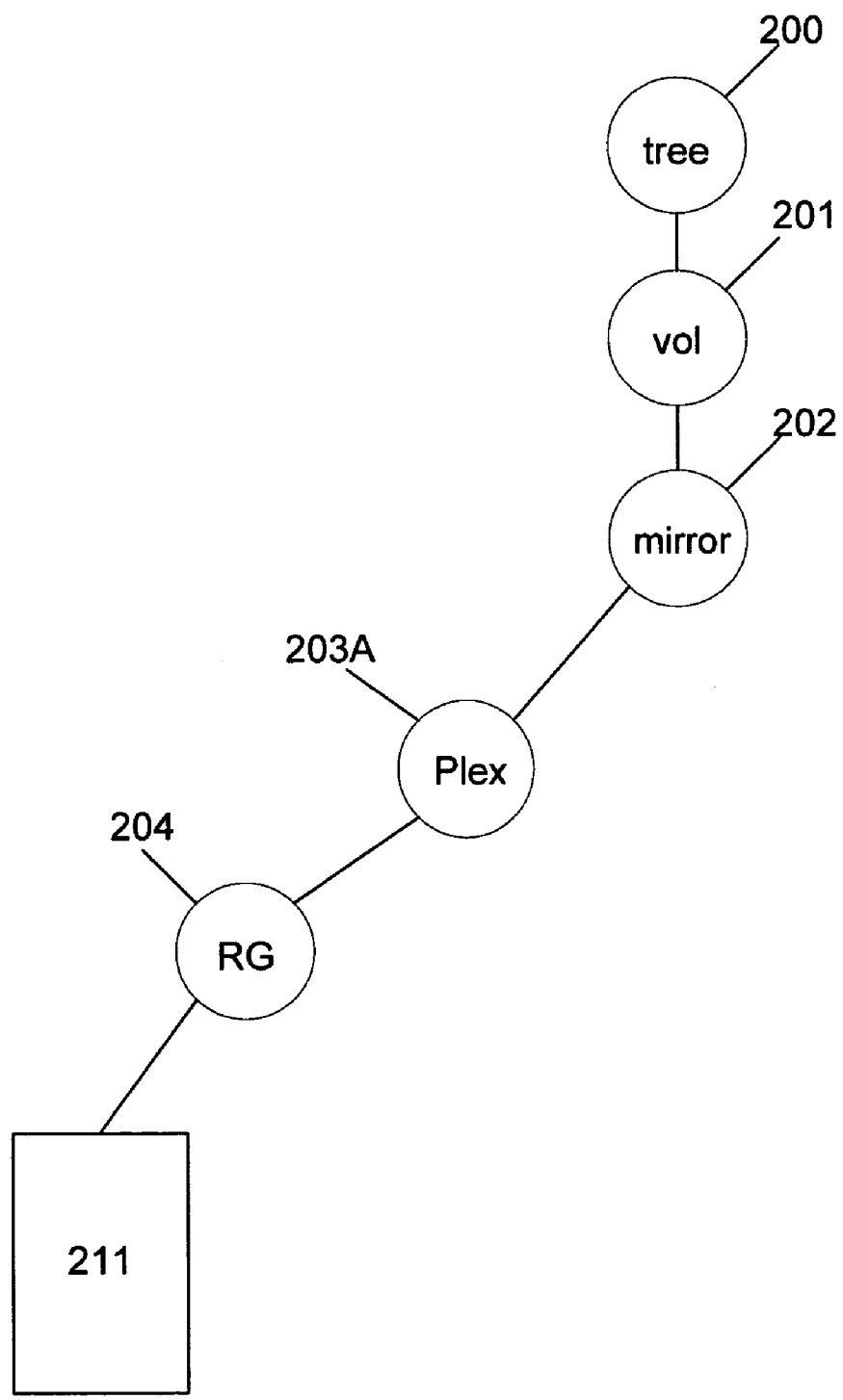
FIG. 10 is a block diagram showing the creation of a path in the data structure of a tree object, in accordance with an embodiment of the invention.

After configurations have been determined for disks, a data structure is created for a tree object based on the configurations determined for the disks. For example, using disk 211 (FIG. 9A) as an example, a determination is made if the system memory has a tree object with configuration information that matches configuration M in the labels L1/L2 of disk 211. If not, then a tree object 200 (FIG. 10) is created in memory. Next, a determination is made if the tree object 200 has any volume objects 201 with configuration information that matches configuration M of disk 211. If not, then the volume object 201 is created in memory. Next, a determination is made if the volume object 201 has any mirror objects 202 with configuration that matches configuration M of disk 211. If not, then the mirror object 202 is created in memory. Next, a determination is made if the mirror object 202 has any plex objects with configuration that matches the configuration M of disk 211. If not, then the plex object 203A is created in memory. Thus, the path in the data structure of tree object 200 is created for the disk 211 as shown in FIG. 10.

Figure 11:
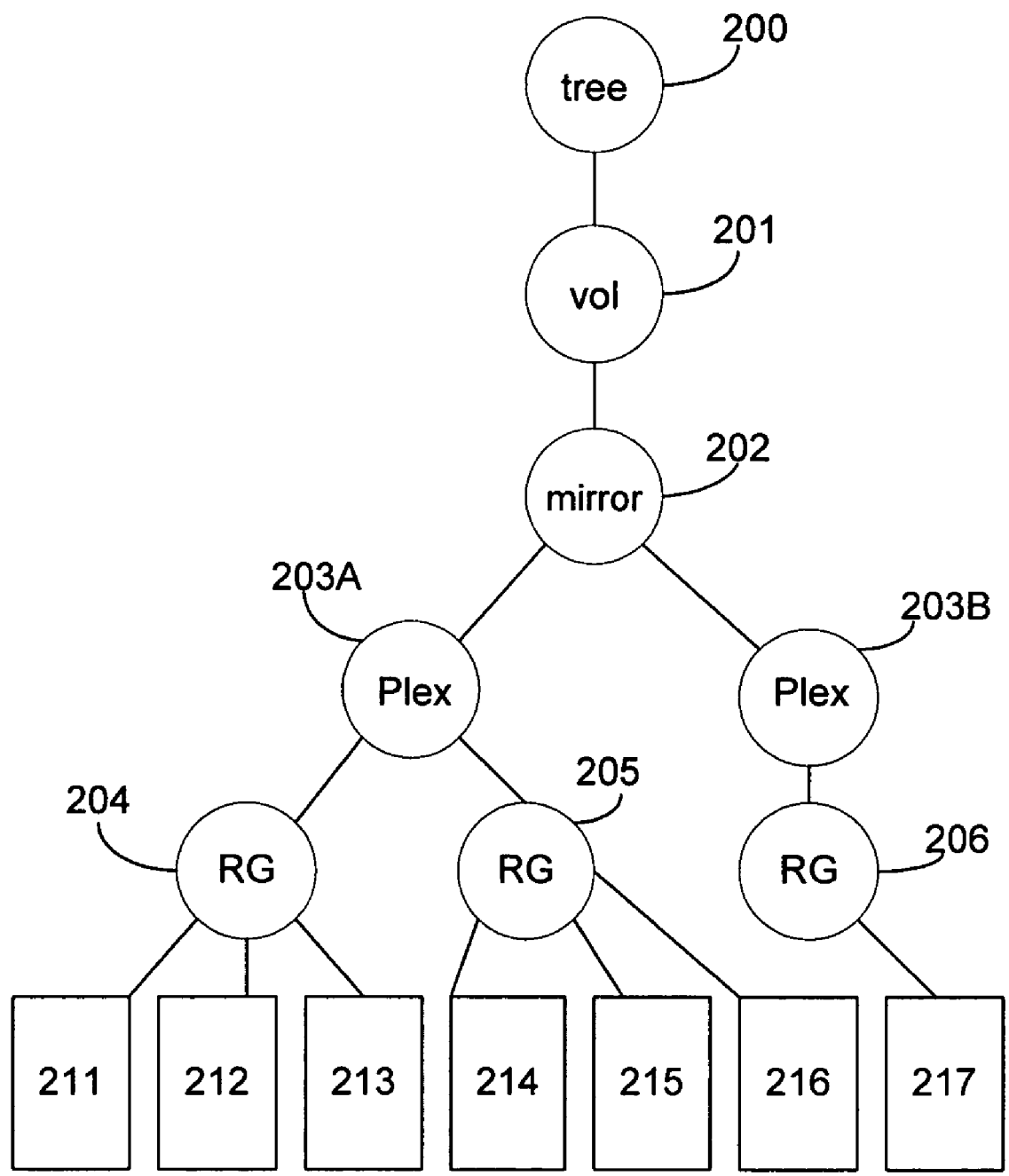
FIG. 11 is a block diagram showing the creation of another path in the data structure of a tree object, in accordance with an embodiment of the invention.

The above actions are performed for all disks to form the appropriate objects. For example, as shown in FIG. 11, the path in the data structure of tree object 200 is created for disk 212. It is noted, for example, that when creating the objects for disk 212, its objects for tree 200, volume 201, and mirror 202, plex 203A, and RAID group 204 have already been created from the above actions. In contrast, for disk 217, plex object 203B and RAID group object 206 will have to be created in memory.

When the data structure has been completed for tree object 200, an image in memory is created as similarly shown for the objects 201–207 in FIG. 2.

Thus, an embodiment of the invention provides a method of storing configuration information for, e.g., a software RAID subsystem, and for using that configuration information to reassemble a particular RAID volume, plex, or other storage volumes. The method can reassemble a RAID volume even if failures occur during the above-described configuration update algorithm.

Advantages provided by an embodiment of the invention may include at least one of the following. One advantage that may be provided by an embodiment of the invention is that assimilation is location-independent with respect to the disks. The applicants believe that many current systems have a difficult time dealing with disks that have been moved about (one current system example requires the disks to always be in fixed positions, and another current system example requires multiple reboots to determine the configuration if a disk is moved). In an embodiment of the invention, as long as all the disks are visible to the machine, their disk location is irrelevant; an embodiment of a method of assimilation, as discussed above, can proceed with no need for a separate reconfiguration step.

An embodiment of the invention may also advantageously provide a software-only solution, where no special-purpose hardware is required to perform the above methods. An embodiment of the invention may also advantageously provide a robust solution for reassembling a RAID volume, where there is no central repository of metadata that can fail or cause data loss. Instead, in an embodiment, the configuration information is spread across the disks with the filesystem 152 data so that only a failure that causes loss of filesystem 152 data may or may not affect the stored volume configuration information. Even in this scenario, the volume can be at least partially reconstructed. As also mentioned above, the RAID volume can still be reassembled even if there is as system crash or other events during a configuration update. Additionally, in an embodiment, the above methods can be run repeatedly on the same disks and yield the same results, unlike current or previous technologies.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method of assigning a configuration containing multiple plexes to a collection of storage units, the method comprising:
   identifying for a specific configuration by use of a configuration identifier; and
   assigning the specific configuration as the configuration of the collection of storage units, wherein the specific configuration is stored in a first label and in a second label of a storage unit in the collection of storage units, wherein the specific configuration is a most recently written configuration in the collection of storage units, wherein the most recently written configuration is identified by use of a time stamp or a sequence number, and wherein each of the time stamp and sequence number associated with the most recently written configuration is stored in the first label and in the second label.

2. The method of claim 1, wherein the storage unit comprises a disk.

3. The method of claim 1, wherein the configuration for a storage unit comprises:
   information for identifying and placing a storage unit within a larger collection of storage units; and
   general information about the larger collection of storage units.

4. The method of claim 1 wherein the storage unit is configured in accordance with RAID level 4.

5. The method of claim 1, wherein the configuration identifier is based on the sequence number indicating a configuration update count for the configuration.

6. The method of claim 1, wherein the configuration identifier is based on the time stamp indicating a time of a previous configuration update for the configuration.

7. The method of claim 1, wherein the configuration is used to create a tree of objects indicating an assignment of the storage unit in a logical collection.

8. The method of claim 7, wherein the logical collection is a RAID group.

9. The method of claim 7, wherein the logical collection is a plex.

10. The method of claim 7, wherein the logical collection is a volume mirror.

11. The method of claim 7, wherein the logical collection is a volume.

12. The method of claim 1, wherein the collection of disk is implemented in a file server.

13. The method of claim 12, wherein the file server is connected to a network.

14. The method of claim 1, wherein the most recently written configuration is not stored in a first label and a second label of each disk, and assigning a next most recently written configuration as the configuration of the collection when the next most recently written configuration is stored in a first label and a second label of at least one disk in the collection.

15. An apparatus for assigning a configuration containing multiple plexes to a collection of storage units, the apparatus comprising:
    means for identifying for a specific configuration by use of a configuration identifier; and
    coupled to the identifying means, means for assigning the specific configuration as the configuration of the collection, wherein the specific configuration is stored in a first label and in a second label of a storage unit in the collection of storage units, wherein the specific configuration is a most recently written configuration in the collection of storage units, wherein the most recently written configuration is identified by use of a time stamp or a sequence number, and wherein each of the time stamp and sequence number associated with the most recently written configuration is stored in the first label and in the second label.

16. The apparatus of claim 15, further comprising: means for assigning a next most recently written configuration as the configuration of the collection when the next most recently written configuration is stored in a first label and a second label of at least one disk in the collection and when the most recently written configuration is not stored in a first label and a second label of each disk.

17. An article of manufacture, comprising:
    a machine-readable medium having stored thereon instructions to:
    identify for a specific configuration by use of a configuration identifier, where the specific configuration contains multiple plexes in a collection of storage units; and
    assign the specific configuration as the configuration of the collection of storage units, wherein the specific configuration is stored in a first label and in a second label of a storage unite in the collection of storage units, wherein the specific configuration is a most recently written configuration in the collection of storage units, wherein the most recently written configuration is identified by use of a time stamp or a sequence number, and wherein each of the time stamp and sequence number associated with the most recently written configuration is stored in the first label and in the second label.

18. The article of manufacture of claim 17, wherein the instructions further comprises: when the most recently written configuration is not stored in a first label and a second label of each disk, then assign a next most recently written configuration as the configuration of the collection when the next most recently written configuration is stored in a first label and a second label of at least one disk in the collection.

19. An apparatus for assigning a configuration containing multiple plexes to a collection of storage units, the method comprising:

a storage device manager configured to read a first label and a second label from a storage unit, where the first label provides a first copy of the configuration and the second label provides a second copy of the configuration, the storage device manager further configured to identify for a specific configuration by use of a configuration identifier and assign the specific configuration as the assigned configuration for the collection of storage units, wherein the specific configuration is stored in a first label and in a second label of at least one storage unit in the collection of storage units, wherein the specific configuration is a most recently written configuration in the collection of storage units, wherein the most recently written configuration is identified by use of a time stamp or a sequence number, and wherein each of the time stamp and sequence number associated with the most recently written configuration is stored in the first label and in the second label.

20. The apparatus of claim 19, wherein the storage unit comprises a disk.

21. The apparatus of claim 19, wherein the configuration for a storage unit comprises:
information for identifying and placing a storage unit within a larger collection of storage units; and
general information about the larger collection of storage units.

22. The apparatus of claim 19 wherein the storage unit is configured in accordance with RAID level 4.

23. The apparatus of claim 19, wherein the configuration identifier is based on the sequence number indicating a configuration update count for the configuration.

24. The apparatus of claim 19, wherein the configuration identifier is based on the time stamp indicating a time of a previous configuration update for the configuration.

25. The apparatus of claim 19, wherein the configuration is used to create a tree of objects indicating an assignment of the storage unit in a logical collection.

26. The apparatus of claim 25, wherein the logical collection is a RAID group.

27. The apparatus of claim 25, wherein the logical collection is a plex.

28. The apparatus of claim 25, wherein the logical collection is a volume mirror.

29. The apparatus of claim 25, wherein the logical collection is a volume.

30. The apparatus of claim 19, wherein the collection of disk is implemented in a file server.

31. The apparatus of claim 30, wherein the file server is connected to a network.

32. The apparatus of claim 19, wherein the storage device manager is configured to assign a next most recently written configuration as the configuration of the collection when the next most recently written configuration is stored in a first label and a second label of at least one disk in the collection and when the most recently written configuration is not stored in a first label and a second label of each disk.

33. A method of identifying multiple collections of storage units from a common collection of storage units, the method comprising:
reading a first label and a second label from a storage unit in the common collection, where the first label provides a first copy of the configuration and the second label provides a second copy of the configuration, where the configuration contains multiple plexes;
identifying for a specific configuration by use of a configuration identifier, where the configuration identifier is used to identify which disks belong to the most recent common configuration of the collection; and identifying a collection identifier that references which collection that a storage unit potentially belongs to, by determining that the specific configuration is stored in a first label and in a second label of a storage unit in the common collection and that the specific configuration is a most recently written configuration in the common collection, wherein the most recently written configuration is identified by use of a time stamp or a sequence number, and wherein each of the time stamp and sequence number associated with the most recently written configuration is stored in the first label and in the second label.

34. A method of identifying a most recent configuration shared by a collection of storage units, the method comprising:
reading a configuration from a first label and from a second label of all storage units in the collection, where the configuration contains multiple plexes; and
assigning a specific configuration as the assigned configuration of the collection of storage units wherein the specific configuration is stored in a first label and in a second label of at least one storage unit in the collection, wherein the specific configuration is a most recently written configuration in the collection, wherein the most recently written configuration is identified by use of a time stamp or a sequence number, and wherein each of the time stamp and sequence number associated with the most recently written configuration is stored in the first label and in the second label.

35. The method of claim 34, wherein the storage unit comprises a disk.

36. The method of claim 34, wherein the configuration for a storage unit comprises:
information for identifying and placing a storage unit within a larger collection of storage units; and
general information about the larger collection of storage units.

37. The method of claim 34, wherein when the most recently written configuration is not stored in a first label and a second label of each disk, then assigning a next most recently written configuration as the configuration of the collection when the next most recently written configuration is stored in a first label and a second label of at least one disk in the collection.

38. An apparatus for identifying a most recent configuration shared by a collection of storage units, the apparatus comprising:
a storage device manager configured to read a configuration from a first label and from a second label of all storage units in the collection where the configuration contains multiple plexes, and to assign a specific configuration as the assigned configuration of the collection of storage units wherein the specific configuration is stored in a first label and in a second label of at least one storage unit in the collection, wherein the specific configuration is a most recently written configuration in the collection, wherein the most recently written configuration is identified by use of a time stamp or a sequence number, and wherein each of the time stamp and sequence number associated with the most recently written configuration is stored in the first label and in the second label.

39. The apparatus of claim 38, wherein the storage unit comprises a disk.

40. The apparatus of claim 38, wherein the configuration for a storage unit comprises:
information for identifying and placing a storage unit within a larger collection of storage units; and
general information about the larger collection of storage units.

41. The apparatus of claim 38, wherein the storage device manager is configured to assign a next most recently written configuration as the configuration of the collection when the next most recently written configuration is stored in a first label and a second label of at least one disk in the collection and when the most recently written configuration is not stored in a first label and a second label of each disk.

42. A method of identifying a most recent common configuration among a collection of storage units, the method comprising:
where a most recent configuration is not stored in a first label and second label of each storage unit in the collection,
determining the next most recent configuration in the collection; and
assigning the next most recent configuration as the assigned configuration for the collection, wherein the next most recent configuration is in a first label and in a second label of a storage unit in the collection, wherein each configuration contains multiple plexes, wherein the next most recent configuration is identified by use of a time stamp or a sequence number, and wherein each of the time stamp and sequence number associated with the next most recently written configuration is stored in the first label and in the second label.

43. The method of claim 42, wherein the storage unit comprises a disk.

44. The method of claim 43, wherein the most recent configuration for a storage unit comprises:
information for identifying and placing a storage unit within a larger collection of storage units; and
general information about the larger collection of storage units.

45. An apparatus for identifying a storage unit in a collection of storage units, the method comprising:
a storage device manager configured to determine the next most recent configuration in the collection wherein the most recent configuration is not stored in a first label and a second label of each storage unit in the collection, and assign a next most recent configuration as the assigned configuration for the collection, wherein the next most recent configuration is in a first label and in a second label of the storage unit of the collection, where the storage unit does not include the most recent configuration in the collection, where each configuration contains multiple plexes, wherein the next most recently written configuration is identified by use of a time stamp or a sequence number, and wherein each of the time stamp and sequence number associated with the next most recently written configuration is stored in the first label and in the second label.

46. A method of building a raidtree in a memory data structure, where the raidtree includes multiple plexes and multiple PAID groups, the method comprising:
using a most recent common configuration of a collection of storage units;
using the configuration stored in one of a first label and in a second label in each storage unit; and
ignoring storage units identified as being in the collection and not having the most recent common configuration, so that these ignored storage units are not included in the multiple RAID groups, wherein the most recent common configuration is identified by use of a time stamp or a sequence number, and wherein each of the time stamp and sequence number associated with the most recent common configuration is stored in the first label and in the second label.

47. The method of claim 46, wherein the storage unit comprises a disk.

48. The method of claim 46, wherein the most recent common configuration for a storage unit comprises:
information for identifying and placing a storage unit within a larger collection of storage units; and
general information about the larger collection of storage units.

49. An apparatus for building a raidtree in a memory data structure, where the raidtree includes multiple plexes and multiple PAID groups, the apparatus comprising:
a storage device manager configured to use a most recent common configuration of a collection of storage units, the storage device manage configured to use the configuration stored in one of a first label and in a second label in each storage unit and ignore storage units identified as being in the collection and not having the most recent common configuration, so that these ignored storage units are not included in the multiple RAID groups, wherein the most recent common configuration is identified by use of a time stamp or a sequence number, and wherein each of the time stamp and sequence number associated with the most recent common configuration is stored in the first label and in the second label.

50. The apparatus of claim 49, wherein the storage unit comprises a disk.

51. The apparatus of claim 49, wherein the most recent common configuration for a storage unit comprises:
information for identifying and placing a storage unit within a larger collection of storage units; and
general information about the larger collection of storage units.

52. A method of assigning configuration information to a collection of disks, where the collection includes, a degenerate plex among multiple plexes, the method comprising:
choosing a most recent configuration in the degenerate plex, wherein the most recent configuration is stored in a first label and in a second label of a storage unit in the degenerate plex, wherein the most recent configuration is identified by use of a time stamp or a sequence number, and wherein each of the time stamp and sequence number associated with the most recent configuration is stored in the first label and in the second label; and
sorting storage units in the degenerate plex based on a membership specified in the labels of the disks, where the membership indicates a volume assigned for a disk.

53. A method of assimilating storage units into a logical collection, the method comprising:
determining a configuration information for each storage unit for possible assignment to the logical collection, where the configuration information includes multiple plexes and where the configuration information is stored in a first label and in a second label in each storage unit; and
creating a tree of objects based on the determined configuration information, wherein the configuration information is identified by use of a time stamp or a sequence number, and wherein each of the time stamp and sequence number associated with the configuration information is stored in the first label and in the second label.

54. The method of claim 53 wherein the configuration information is assigned to a first label and a second label of a storage unit so that the storage unit is sorted into one of multiple logical collections.

55. The method of claim 53, further comprising:
running a verification to verify that the created tree of object is usable.

56. The method of claim 53, wherein the configuration information is determined by determining that the configuration in the first label and second label of the storage unit and determining that the configuration in the first label is the highest configuration.

57. The method of claim 53, wherein the configuration information is determined for a storage unit in a degenerate plex by determining that a time stamp of a configuration in a label of the storage unit in the degenerate plex is equal to a time stamp of a configuration in a sibling plex of the degenerate plex.

58. An apparatus for assimilating storage units into a logical collection, the apparatus comprising:
a storage device manager configured to determine a configuration information for each storage unit for possible assignment to the logical collection, where the configuration information includes multiple plexes and where the configuration information is stored in a first label and in a second label in each storage unit, and create a tree of objects based on the determined configuration information, wherein the configuration information is identified by use of a time stamp or a sequence number, and wherein each of the time stamp and sequence number associated with the configuration information is stored in the first label and in the second label.

59. A method of assigning configuration information to a collection of disks, the method comprising:
determining that a disk has the same configuration information in a first label and in a second label, where the configuration information includes multiple plexes;
determining that the configuration information in the first label is a most recently written configuration, wherein the most recently written configuration is identified by use of a time stamp or a sequence number, and wherein each of the time stamp and sequence number associated with the most recently written configuration is stored in the first label and in the second label; and
assigning the configuration information in the first label to the disk.

60. The method of claim 59, wherein the most recently written configuration is determined by evaluating the sequence number of the configuration, the sequence number incrementing by a value for every update of the configuration.

61. The method of claim 59, further comprising:
when the configuration information in the first label is not the most recently written configuration information, then determining the next most recently written configuration including determining that the next most recently written configuration is in a first label and a second label of a disk.

62. The method of claim 61, further comprising:
assigning the next most recently written configuration to the collection of disks.

63. The method of claim 59, further comprising:
based upon the assigned configuration, creating objects in a tree structure associated with the disk.

64. The method of claim 63, wherein the tree structure defines a volume associated with the disk.

65. An article of manufacture, comprising:
a machine-readable medium having stored thereon instructions to:
determine that a disk has the same configuration information in a first label and in a second label, where the configuration information includes multiple plexes;
determine that the configuration information in the first label is the most recently written configuration, wherein the most recently written configuration is identified by use of a time stamp or a sequence number, and wherein each of the time stamp and sequence number associated with the most recently written configuration is stored in the first label and in the second label;
assign the configuration information in the first label to the disk.

66. A method of assigning configuration information to a collection of disks, the method comprising:
determining a difference in value between a configuration count of a first configuration in a first plex and a configuration count of a second configuration in a second plex is greater than a given value; and
determining that the second configuration is not in a first label and a second label of a disk; and
assigning an assigned configuration to the second plex, where the assigned configuration has a time stamp equal to a time stamp of a configuration in the first plex, where any of the configurations contains multiple plexes and where one of the configurations is stored in a first label and in a second label of each disk and where a version of any of the configurations is identified by use of a time stamp or a sequence number, and wherein each of the time stamp and sequence number is stored in the first label and in the second label.

67. The method of claim 66, further comprising:
based upon the assigned configuration, creating objects in a tree structure associated with the disk.

68. The method of claim 67, wherein the tree structure defines a volume associated with the disk.

69. A method of using configuration information from disks to assemble a volume, the method comprising:
determining a configuration information for each disk for possible assignment to the volume, where the configuration information includes multiple plexes and where the configuration information is stored in a first label and in a second label of each disks;
determining a version of the configuration information by use of a time stamp or a sequence number, wherein each of the time stamp and sequence number associated with the configuration information is stored in the first label and in the second label;
creating a tree of objects based on the determined configuration information;
running verification to verify that the created tree of objects is usable for a storage system; and
performing an activation where the disks are activated for use by the storage system.

70. The method of claim 69, further comprising:
when an error occurs in the disk during the activation, then providing an error notification.

71. A method of forming a data structure for a volume of disks, the method comprising:

determining configuration information for each disk for possible assignment to the volume, where the configuration information contains multiple plexes and where the configuration information is stored in a first label and in a second label of each disk;

determining a version of the configuration information by use of a time stamp or a sequence number, wherein each of the time stamp and sequence number associated with the configuration information is stored in the first label and in the second label;

determining that a memory does not have a tree object with configuration information that matches the configuration information;

forming the tree object with the configuration information;

determining that a memory does not have a volume object with configuration information that matches configuration;

forming the volume object with the configuration information;

determining that a memory does not have a mirror object with configuration information that matches configuration;

forming the mirror object with the configuration information;

determining that a memory does not have a plex object with configuration information that matches configuration;

forming the plex object with the configuration information;

determining that a memory does not have a RAID group object with configuration information that matches configuration; and forming the RAID group object with the configuration information.

72. An apparatus comprising:

a storage device;

a storage device manager configured to manage the storage device and assign a configuration information to the storage device, the configuration information including data assigning the storage device to a particular logical collection, where the configuration information contains multiple plexes, where the configuration information is assigned to the storage device, wherein the configuration information is stored in a first label and in a second label of at least one storage device in a collection, wherein the configuration information is a most recently written configuration information in the collection, wherein the most recently written configuration is identified by use of a time stamp or a sequence number, and wherein each of the time stamp and sequence number associated with the most recently written configuration is stored in the first label and in the second label.

73. The apparatus of claim 72 wherein the storage device is configured in accordance with RAID level 4.

74. The apparatus of claim 72, wherein the configuration information is identified based on the sequence number indicating a configuration update count for the configuration.

75. The apparatus of claim 72, wherein the configuration information is identified based on the time stamp indicating a time of a previous configuration update for the configuration.

76. The apparatus of claim 72, wherein the configuration information is used to create a tree of objects indicating an assignment of the storage device in a volume.

77. An apparatus for assigning configuration information to a collection of disks, the apparatus comprising:

means for determining that a disk has the same configuration information in a first label and in a second label and for determining that the configuration information in the first label is the highest configuration, where the configuration information contains multiple plexes; and coupled to the determining means, means for assigning the configuration information in the first label to the disk wherein the configuration information is in a first label and in a second label in at least one disk in the collection, wherein the configuration information is the highest configuration stored in the collection, wherein the highest configuration is identified by use of a time stamp or a sequence number, and wherein each of the time stamp and sequence number associated with the highest configuration is stored in the first label and in the second label.

78. An apparatus for assigning a configuration to a collection of storage units, the method comprising:

a storage device manager configured to identify for a specific configuration by use of a configuration identifier wherein the specific configuration contains multiple plexes, and assign the specific configuration to a first label of all storage units and then to a second label of all storage units, wherein the specific configuration is in a first label and in a second label in at least one disk in the collection, wherein the specific configuration is a most recently written configuration in the collection, wherein the most recently written configuration is identified by use of a time stamp or a sequence number, and wherein each of the time stamp and sequence number associated with the most recently written configuration is stored in the first label and in the second label.

79. A method of determining a configuration of a collection of storage units, the method comprising:

generating a configuration, where the configuration contains multiple plexes;

identifying for a specific configuration by use of a configuration identifier; and assigning the specific configuration to the first labels of all storage units and then to the second labels of all storage units, and utilizing the configuration identifier to determine the most recent configuration successfully written to all disks in the configuration, wherein the most recent written configuration is identified by use of a time stamp or a sequence number, and wherein each of the time stamp and sequence number associated with the most recent written configuration is stored in the first labels and in the second labels.

80. An apparatus for determining a configuration of a collection of storage units, the apparatus comprising:

a storage device manager configured to generate a configuration, where the configuration contains multiple plexes, identify for a specific configuration by use of a configuration identifier, and assign the specific configuration to the first labels of all storage units and then to the second labels of all storage units, and utilize the configuration identifier to determine the most recent configuration successfully written to all disks in the configuration, wherein the most recent configuration is identified by use of a time stamp or a sequence number, and wherein each of the time stamp and sequence number associated with the most recent configuration is stored in the first labels and in the second labels.

* * * * *